US011965631B1

(12) United States Patent
Luketich et al.

(10) Patent No.: US 11,965,631 B1
(45) Date of Patent: Apr. 23, 2024

(54) LAMP FOR VEHICLE

(71) Applicant: SL Corporation, Daegu (KR)

(72) Inventors: Michael Luketich, Auburn Hills, MI (US); Arun Kumar Pesala, Auburn Hills, MI (US)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/450,265

(22) Filed: Aug. 15, 2023

(51) Int. Cl.
*B60R 1/12* (2006.01)
*F21S 41/143* (2018.01)
*F21S 41/148* (2018.01)
*F21S 41/24* (2018.01)
*F21S 41/365* (2018.01)

(52) U.S. Cl.
CPC ............. *F21S 41/24* (2018.01); *F21S 41/143* (2018.01); *F21S 41/148* (2018.01); *F21S 41/365* (2018.01)

(58) Field of Classification Search
CPC ..... B60R 1/12; B60R 2001/1223; G02B 1/10; B60Q 1/0023; F21S 41/24; F21S 41/365; F21S 41/143; F21S 41/148
See application file for complete search history.

(56) References Cited

U.S. PATENT DOCUMENTS 10,766,401 B1 * 9/2020 Calais ...................... F21S 41/25
2004/0012973 A1 * 1/2004 Baker ...................... G01S 13/86 362/276
2008/0158045 A1 * 7/2008 Teranishi ............... B60Q 1/076 342/70
2008/0180965 A1 * 7/2008 Nakamura .............. G01S 7/027 362/507
2020/0363329 A1 * 11/2020 Okumura ................. G02B 5/26
2022/0348354 A1 * 11/2022 Hessling-von Heimendahl .......... B64D 47/06

* cited by examiner

*Primary Examiner* — Omar Rojas Cadima
(74) *Attorney, Agent, or Firm* — United One Law Group LLC; Kongsik Kim; Jhongwoo Peck

(57) ABSTRACT

A vehicle lamp includes a sensor disposed behind a cover lens and detecting an object around the vehicle; and a light irradiation unit disposed near one side end of the sensor to generate light. The sensor reflects at least some of the light irradiated from the light irradiation unit to allow the at least some of the light irradiated from the light irradiation unit to be transmitted through the cover lens and to proceed forward.

8 Claims, 6 Drawing Sheets

LAMP FOR VEHICLE

BACKGROUND

1. Technical Field

The present disclosure relates to a lamp for a vehicle, and more particularly, to a lamp for a vehicle capable of sensing an object disposed around a vehicle.

2. Description of the Related Art

In general, a vehicle includes various types of lamps having an illumination function for easily confirming objects positioned around the vehicle during low-light conditions (e.g., night-time driving) and a signaling function for informing nearby vehicles or pedestrians of the driving state of the vehicle. The installation standards and specifications of respective lamps are regulated so that the respective lamps may sufficiently perform respective functions.

For example, head lamps, fog lamps, and the like, are mainly used for the purpose of the illumination function; and turn signal lamps, tail lamps, brake lamps, and the like, are mainly used for the purpose of the signaling function.

Recently, vehicles typically include various sensors and electronic devices for driver's convenience, and particularly, research into an advanced driver assistance system (ADAS) has been conducted for the driver's convenience. As an example, the development of a lamp for a vehicle having an ADAS function has been actively conducted.

SUMMARY

Aspects of the present disclosure provide a lamp for a vehicle that can sense an object disposed around the vehicle. Aspects of the present disclosure also provide a lamp for a vehicle that can prevent a relatively dark appearance from being formed due to a sensing module that senses an object disposed around the vehicle. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a vehicle lamp may include a sensor (e.g., sensing module) disposed behind a cover lens; and a light irradiation unit disposed near one side end of the sensor. The sensor may detect an object around the vehicle, and the light irradiation unit may generate and irradiate light. The sensor may reflect at least some of the light irradiated from the light irradiation unit to allow the at least some of the light irradiated from the light irradiation unit to be transmitted through the cover lens and to proceed forward.

The sensor may include a paint layer formed on at least a portion of a surface thereof that faces the cover lens to allow the light generated from the light irradiation unit to be reflected forward, and the paint layer may be formed in a predetermined color. For example, the paint layer may be formed in a white color.

The light irradiation unit may include at least one light source and a reflector that reflects the light generated from the at least one light source to allow the light to proceed toward the paint layer.

A light guide unit may be disposed in front of the paint layer to prevent the sensor from being visible from exterior of the lamp. The light irradiation unit may be disposed laterally from the light guide unit, and the light guide unit may guide the light incident from the light irradiation unit to allow the light to proceed forward. The light guide unit may include a first guide disposed in front of the paint layer and a second guide disposed in front of the first guide. At least one of the first guide or the second guide may include a diffusion pattern formed on at least a portion thereof for diffusing the light. At least one of the first guide or the second guide may be formed so that a thickness thereof in a front-back direction becomes smaller as it becomes more distant from the light irradiation unit.

The lamp for a vehicle according to the present disclosure has one or more of the following effects. By including a paint layer having a color capable of reflecting light on a surface of the sensor that detects an object around the vehicle, it is possible to form a lighting image by the sensor, and it is thus possible to prevent a relatively dark appearance from being formed due to the sensor. The effects of the present disclosure are not limited to the aforementioned ones, and other effects that are not mentioned may be understood by one of ordinary skill in the art from the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
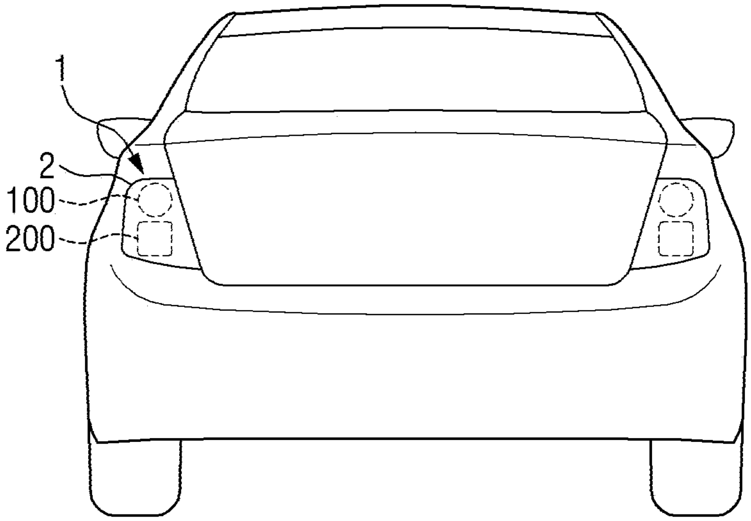
FIG. 1 schematically illustrates an appearance of a lamp for a vehicle according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of idealized embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will describe lamps for a vehicle according to exemplary embodiments of the present disclosure with reference to the drawings.

FIG. 1 schematically illustrates an appearance of a lamp for a vehicle according to an exemplary embodiment of the present disclosure. Referring to FIG. 1, a lamp 1 for a vehicle according to an exemplary embodiment of the present disclosure may include at least one optical system 100 for irradiating light to the exterior of the vehicle and a sensor (e.g., sensing module) 200 for sensing an object disposed around the vehicle. The optical system 100 and the sensor 200 may be accommodated in an internal space formed by a cover lens 2 that forms a portion of a body line (e.g., exterior contour) of the vehicle and a lamp housing coupled with the cover lens 2.

FIG. 1 illustrates an example where the lamp 1 for a vehicle according to the present disclosure is a rear lamp installed at the rear of the vehicle, and where the lamp 1 for a vehicle is used for the purpose of informing a following vehicle of a driving state of the vehicle such as deceleration or lane change. However, this is only an example for assisting in the understanding of the present disclosure, and the present disclosure is not limited thereto. The lamp 1 for a vehicle according to the present disclosure may be used for purposes of various lamps installed in the vehicle for an illumination function and/or a signaling function.

The lamp 1 for a vehicle according to the present disclosure may be used for a single purpose or may be used for two or more purposes, and the number of optical systems included in the lamp 1 for a vehicle according to the present disclosure may be varied depending on the purpose.

For example, when the lamp 1 for a vehicle according to the present disclosure is used for a single purpose, the lamp 1 for a vehicle according to the present disclosure may include a single optical system. When the lamp 1 for a vehicle according to the present disclosure is used for two or more purposes, the lamp 1 for a vehicle according to the present disclosure may include two or more optical systems.

The optical system 100 may include a light source that generates light. In addition, the optical system 100 may include optical elements such as a reflector and a lens that satisfy required light distribution characteristics, such as position, size, shape, brightness, and the like, of an area to be irradiated with the light. The optical elements included in the optical system 100 may be added, omitted or modified depending on the purpose of the lamp 1 for a vehicle according to the present disclosure.

In an exemplary embodiment of the present disclosure, the cover lens 2 may be used in common for the optical system 100 and the sensor 200. This is because when cover lenses are respectively provided for the optical system 100 and the sensor 200, not only cost may increase due to the increased number of components, but also a sense of connectedness between the optical system 100 and the sensor 200 may be deteriorated due to the cover lenses provided each of the optical system 100 and the sensor 200, respectively.

In this case, it may be understood that the common use of the cover lens 2 for the optical system 100 and the sensor 200 means that the lamp housing is also used in common for the optical system 100 and the sensor 200.

Meanwhile, when the cover lens 2 is used commonly for the optical system 100 and the sensor 200 as described above, a lighting image may be formed in an area of the cover lens 2 that corresponds to the optical system 100, while a lighting image is not formed in an area of the cover lens 2 that corresponds to the sensor 200, such that a relatively dark appearance (e.g., a shadow spot) is formed, and thus, the aesthetics of the design may be deteriorated.

To solve this potential problem, in an exemplary embodiment of the present disclosure, the lighting image may be allowed to be formed in the area of the cover lens 2 that corresponds to the sensor 200 while sufficiently securing sensing performance of the sensor 200.

Figure 2:
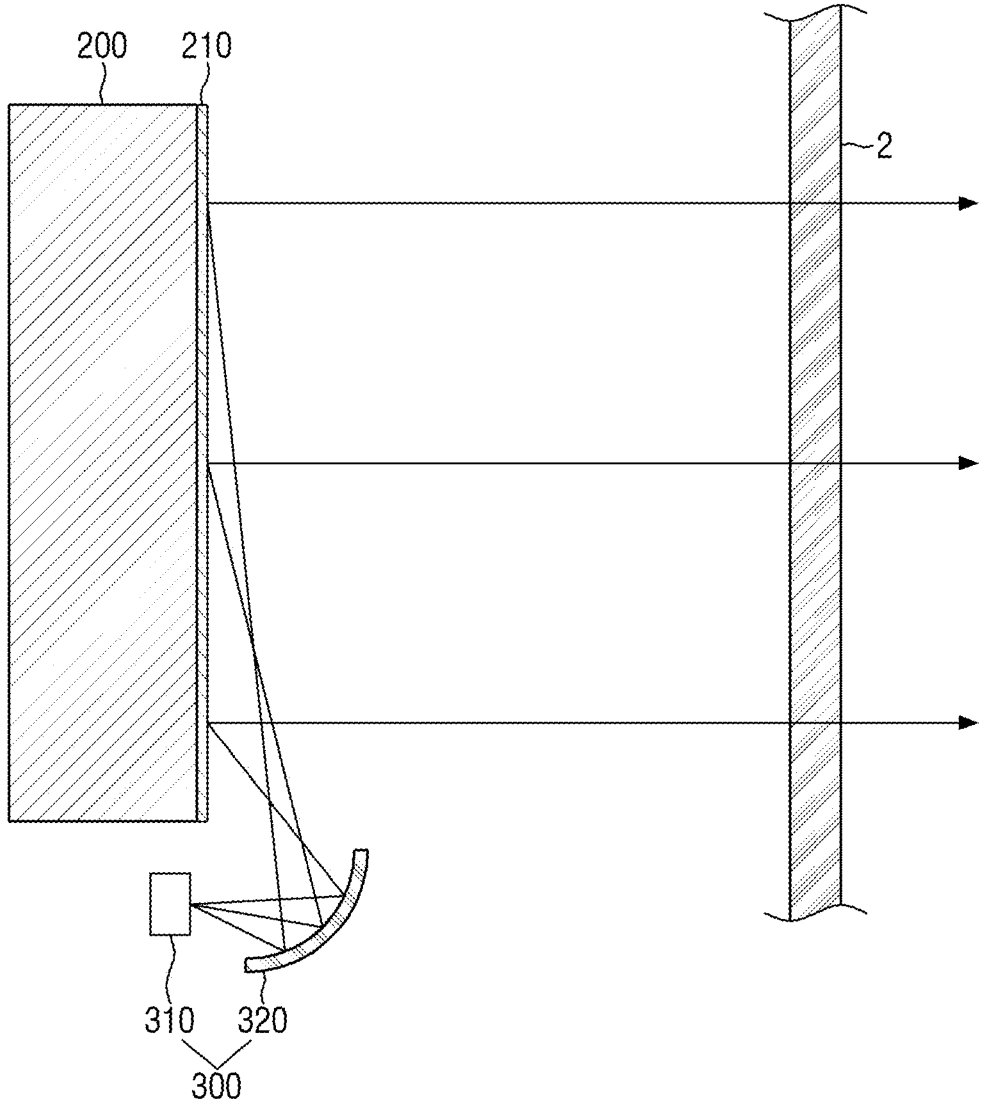
FIG. 2 schematically illustrates a configuration of the lamp for a vehicle according to an exemplary embodiment of the present disclosure.

FIG. 2 schematically illustrates the lamp for a vehicle according to an exemplary embodiment of the present disclosure. Referring to FIG. 2, the lamp 1 for a vehicle according to the present disclosure may include a sensor 200 and a light irradiation unit 300.

The sensor 200 may sense an object disposed around the vehicle, and may include a radio detecting and ranging (RADAR) sensor or a laser detection and ranging (LIDAR) sensor as an example, but the present disclosure is not limited thereto. The sensor 200 may include various types of sensors capable of sensing surrounding objects, such as an ultrasonic sensor and an infrared sensor, as well as the RADAR sensor and the LIDAR sensor.

The RADAR sensor may detect whether or not an object has moved, a speed of the object, and the like, by calculating a time difference between an output radio wave and a radio wave that is reflected by the object and then received to calculate a distance to the object disposed around the vehicle and by reading an intensity, a magnitude, a shape, and the like, of the radio wave that is reflected by the object and then returns.

The LIDAR sensor operates in a similar manner as the RADAR sensor, but is different form the RADAR sensor in that it uses a laser instead of the radio wave, and emits a high-output laser pulse and measures a time required for the high-output laser pulse to hit an object and then return to read the distance to the object, the shape of the object, and the like.

The sensor 200 may include a paint layer 210 formed by applying a paint of a color capable of reflecting light to at least a portion of a surface thereof that faces the cover lens 2. In an exemplary embodiment of the present disclosure, an example where a white paint having high reflectivity is used as a material of the paint layer 210 will be described by way of example. However, this is only an example for assisting in the understanding of the present disclosure, and the present disclosure is not limited thereto. The color of the paint layer 210 may be selected depending on required reflectivity and the like.

Meanwhile, the light irradiation unit 300 may irradiate light to the paint layer 210 of the sensor 200, and the light irradiated from the light irradiation unit 300 may be reflected forward by the paint layer 210 that is formed on a front surface of the sensor 200 so as to be transmitted through the cover lens 2 disposed in front of the sensor 200 and to form a lighting image.

Here, the description that the sensor 200 reflects the light forward means that the sensor 200 reflects the light in a direction toward the cover lens 2, and an actual direction of the term "forward" may depend on the position and/or the direction in which the lamp 1 for a vehicle according to the present disclosure is installed within the vehicle.

The light irradiation unit 300 may be disposed near one side end of the sensor 200 so as to be disposed outside of the frontal area of the sensor 200 such that the light irradiation unit 300 does not interfere with the frontal area of the sensor 200. Accordingly, deterioration in sensing performance of the sensor 200 may be prevented, and the light irradiated from the light irradiation unit 300 may be irradiated to the paint layer 210 in substantially entirety and may be reflected and proceed forward by the paint layer 210. In this case, the lighting image may be formed by the sensor 200 when viewed from the exterior, and thus, no dark spot may be formed.

In this case, the light irradiation unit 300 may generate light having a color and/or an amount of light that is the same as or different from that of the optical system 100, and accordingly, the light generated from the optical system 100 and the light reflected by the sensor 200 may be used for the same purpose or different purposes.

For example, when the light generated from the optical system 100 is used for a purpose of a brake lamp, the light reflected by the sensor 200 may be used for a purpose of the brake lamp like the optical system 100. Alternatively, the light reflected by the sensor 200 may be used for a purpose different from that of the light generated from the optical system 100, such as a turn signal lamp, depending on time, color, or the like, when the light is irradiated from the light irradiation unit 300.

In an exemplary embodiment of the present disclosure, an example where the light irradiation unit 300 includes a light source 310 and a reflector 320 will be described by way of example. In this case, a path of light may be adjusted so that the light generated from the light source 310 reaches the paint layer 210 as a whole by the reflector 320.

In the light irradiation unit 300, the number of light sources 310, the color of the light generated from the light source 310, and the like, may be variously changed depending on the purpose of the lighting image to be formed by the light reflected by the sensor 200.

Figure 3:
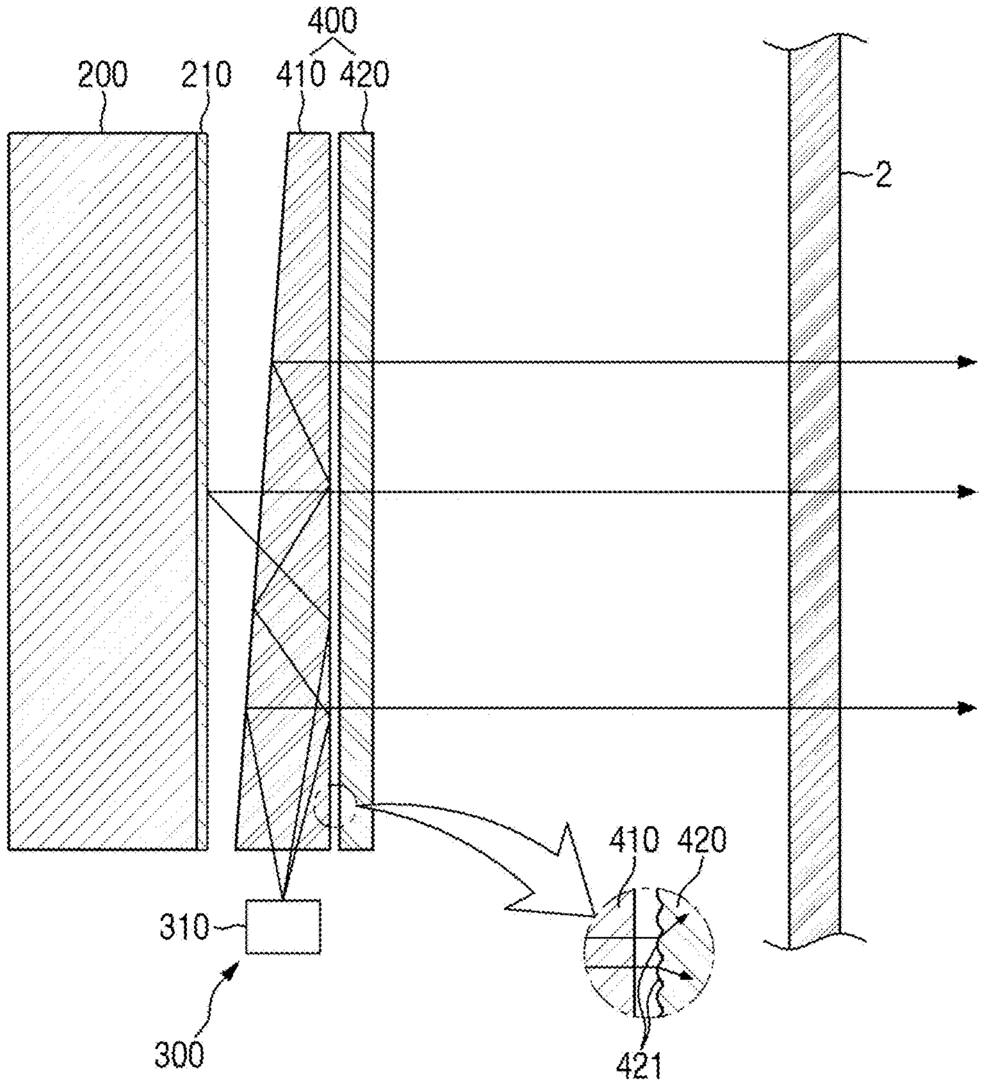
FIG. 3 schematically illustrates a configuration of a lamp for a vehicle according to another exemplary embodiment of the present disclosure.

FIG. 3 schematically illustrates a lamp for a vehicle according to another exemplary embodiment of the present disclosure. Referring to FIG. 3, a lamp 1 for a vehicle according to another exemplary embodiment of the present disclosure may include a sensor 200 and a light irradiation unit 300, similar to the above-described exemplary embodiment, and may further include a light guide unit 400 for guiding the light irradiated from the light irradiation unit 300 so that the light travels forward.

The light guide unit 400 may be disposed in front of the sensor 200 to allow the sensor 200 to be hidden when viewed from the exterior, and may serve to guide the light generated from the light irradiation unit 300 so that the light travels forward.

The light guide unit 400 may include a first guide 410 and a second guide 420 disposed in front of the first guide 410. The first guide 410 may be formed so that a thickness thereof in a front-back direction becomes smaller as it becomes more distant laterally from the light irradiation unit 300 based on the front-back direction. Since the amount of light emitted from the first guide 410 becomes relatively lower due to the diffusion or the like of the light as the first guide 410 becomes more distant from the light irradiation unit 300, the first guide 410 may have a substantially uniform amount of light as a whole due to the thickness of the first guide 410 in the front-back direction becoming smaller to make the light path relatively shorter.

A diffusion pattern 421 for diffusing the light may be formed on a surface of the second guide 420 on which the light emitted from the first guide 410 is incident, and accordingly, the light emitted from the light guide unit 400 may have substantially uniform brightness.

An example where the thickness of the first guide 410 becomes smaller as the first guide 410 becomes more distant from the light irradiation unit 300 increases and a thickness of the second guide 420 is constant has been described by way of example in FIG. 3. However, the present disclosure is not limited thereto, and at least one of the first guide 410 or the second guide 420 may be formed so that a thickness thereof in the front-back direction becomes smaller as it becomes laterally more distant from the light irradiation unit 300, such that a thickness of the light guide unit 400 as a whole may become smaller as the light guide unit 400 becomes more distant from the light irradiation unit 300.

In another exemplary embodiment of the present disclosure, an example where the light guide unit 400 includes two guide units 410 and 420 has been described by way of example. However, this is only an example for assisting in the understanding of the present disclosure, and the present disclosure is not limited thereto. The light guide unit 400 may include at least one guide that allows the light irradiated from the light irradiation unit 300 to have a required amount of light.

Figure 4:
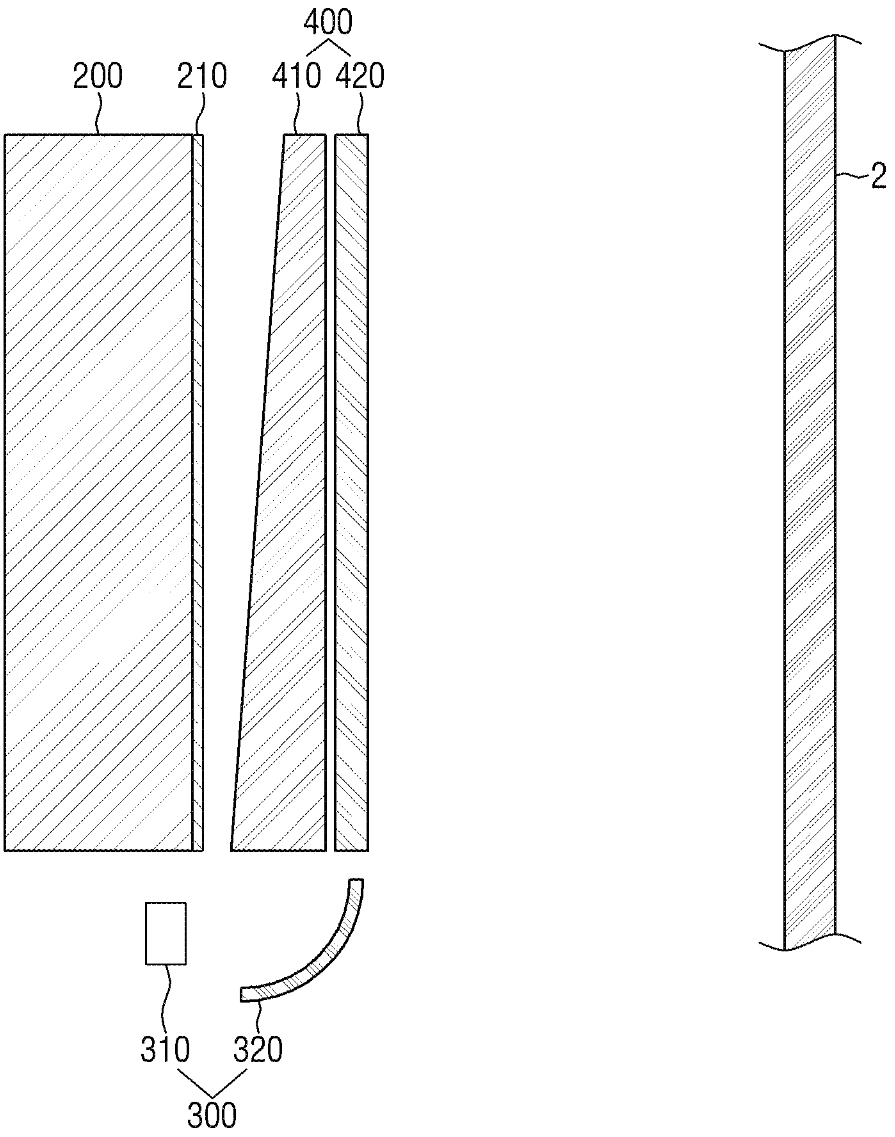
FIG. 4 schematically illustrates a configuration of a lamp for a vehicle according to still another exemplary embodiment of the present disclosure.

In addition, in another exemplary embodiment of the present disclosure, an example where the light irradiation unit 300 includes the light source 310 and no reflector has been described by way of example. However, this is due to the design consideration such as the position of the light source 310. The present disclosure is not limited thereto, and as illustrated in FIG. 4, the light irradiation unit 300 may include both the light source 310 and the reflector 320 along with the light guide unit 400.

Figure 5:
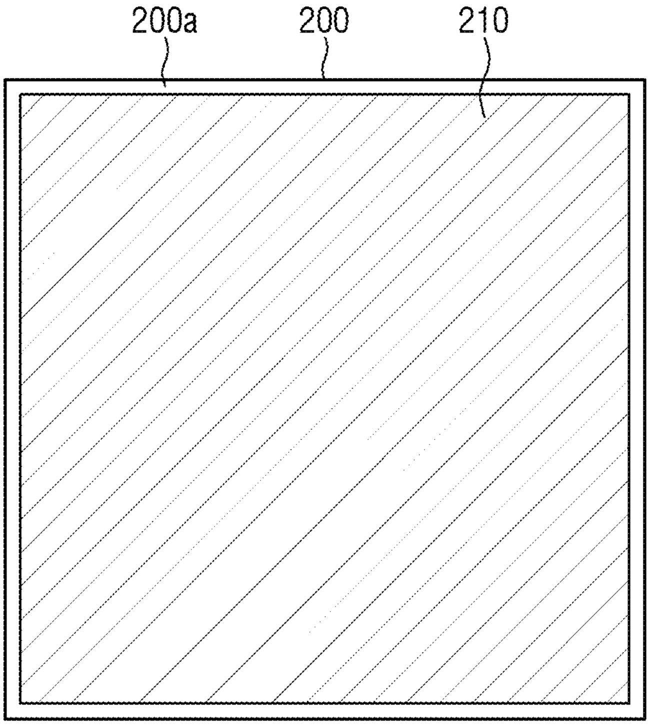
FIGS. 5 and 6 schematically illustrate a paint layer formed on a sensor according to an exemplary embodiment of the present disclosure.
Figure 6:
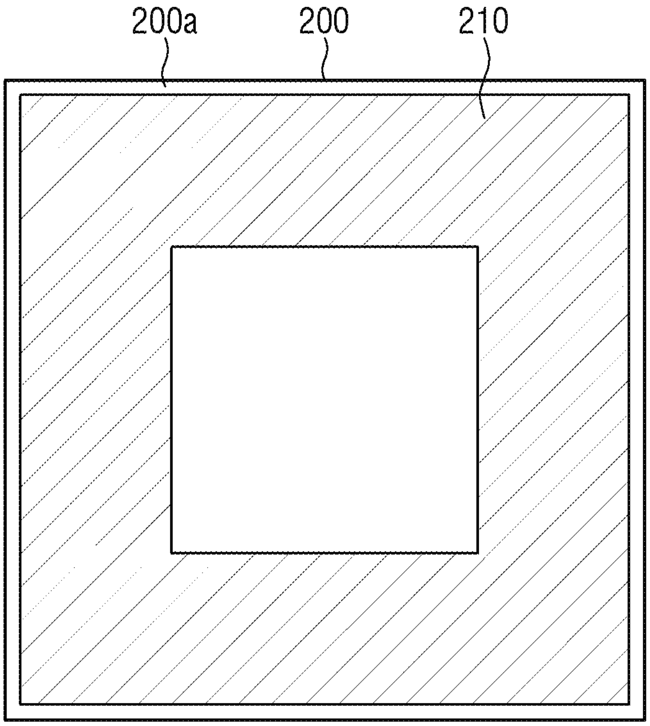

Further, in an exemplary embodiment of the present disclosure, the paint layer 210 of the sensor 200 may be formed on the entirety of a front surface 200*a* of the sensor 200 that faces the cover lens 2 as illustrated in FIG. 5 or may be formed on a portion of the front surface 200*a* as illustrated in FIG. 6. The configuration may be changed depending on the type, sensing method, or the like, of the sensor 200.

For example, when the sensor 200 is implemented as a RADAR sensor that uses a radio wave, deterioration in the sensing performance may not occur even with the paint layer 210, and thus, the paint layer 210 may be formed on the substantially entire front surface 200*a* of the sensor 200. Alternatively, when the sensor 200 is implemented as a LIDAR sensor that uses light such as a laser, deterioration in sensing performance of the sensor 200 may occur due to the paint layer 210, and thus, the paint layer 210 may be formed on a portion of the front surface 200*a* of the sensor 200 excluding the portion of the front surface 200*a* of the sensor 200 that affects the sensing performance in order to prevent the deterioration in the sensing performance.

As described above, in the lamp 1 for a vehicle according to the present disclosure, even when the cover lens 2 is used commonly for the optical system 100 and the sensor 200, the lighting image may be formed due to the light reflected by the sensor 200. Therefore, it is possible to prevent a phenomenon that the area of the cover lens 2 corresponding to the sensor 200 forms a dark spot, thereby deteriorating the appearance.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:

1. A lamp for a vehicle, comprising:

a sensor disposed behind a cover lens, wherein the sensor detects an object around the vehicle; and a light irradiation unit disposed near one side end of the sensor, wherein the light irradiation unit irradiates light, wherein the sensor reflects at least some of the light irradiated from the light irradiation unit to allow the at least some of the light irradiated from the light irradiation unit to be transmitted through the cover lens and to proceed forward, wherein the sensor includes a paint layer formed on at least a portion of a surface of the sensor that faces the cover lens to allow the light generated from the light irradiation unit to be reflected forward, and wherein the paint layer is formed in a predetermined color.

2. The lamp for a vehicle of claim 1, wherein the paint layer is formed in a white color.

3. The lamp for a vehicle of claim 1, wherein the light irradiation unit includes at least one light source and a reflector that reflects the light generated from the at least one light source to allow the light to proceed toward the paint layer.

4. The lamp for a vehicle of claim 1, further comprising:

a light guide unit disposed in front of the paint layer to prevent the sensor from being visible from exterior of the lamp.

5. The lamp for a vehicle of claim 4, wherein the light irradiation unit is disposed laterally from the light guide unit, and wherein the light guide unit guides the light incident from the light irradiation unit to allow the light to proceed forward.

6. The lamp for a vehicle of claim 4, wherein the light guide unit includes a first guide disposed in front of the paint layer and a second guide disposed in front of the first guide, and wherein at least one of the first guide or the second guide includes a diffusion pattern formed on at least a portion thereof for diffusing the light.

7. The lamp for a vehicle of claim 6, wherein at least one of the first guide or the second guide is formed so that a thickness thereof in a front-back direction becomes smaller as it becomes more distant from the light irradiation unit.

8. A lamp for a vehicle, comprising:

a sensor disposed behind a cover lens, wherein the sensor detects an object around the vehicle;

a light irradiation unit disposed near one side end of the sensor, wherein the light irradiation unit irradiates light; and a light guide unit disposed in front of the sensor to prevent the sensor from being visible from exterior of the lamp, wherein the sensor reflects at least some of the light irradiated from the light irradiation unit to allow the at least some of the light irradiated from the light irradiation unit to be transmitted through the cover lens and to proceed forward, wherein the light guide unit includes a first guide disposed in front of the sensor and a second guide disposed in front of the first guide, and wherein at least one of the first guide or the second guide includes a diffusion pattern formed on at least a portion thereof for diffusing the light.

* * * * *